(12) United States Patent
Yang et al.

(10) Patent No.: US 7,884,902 B2
(45) Date of Patent: Feb. 8, 2011

(54) TRANSMISSION LIQUID CRYSTAL DISPLAY HAVING DISCOTIC MOLECULAR FILM

(75) Inventors: Chiu-Lien Yang, Miao-Li (TW); Wei-Yi Ling, Miao-Li (TW); Chia-Lung Lin, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 1136 days.

(21) Appl. No.: 11/590,548

(22) Filed: Oct. 30, 2006

(65) Prior Publication Data

US 2007/0097301 A1      May 3, 2007

(30) Foreign Application Priority Data

Oct. 28, 2005    (TW) .............................. 94137840 A

(51) Int. Cl.
  *G02F 1/1335*   (2006.01)
(52) U.S. Cl. ...................................... 349/117; 349/119
(58) Field of Classification Search ................. 349/117, 349/118, 119, 120, 121
  See application file for complete search history.

(56) References Cited

U.S. PATENT DOCUMENTS 5,249,071 A     9/1993 Yoshimizu et al.
6,295,109 B1    9/2001 Kubo et al.
6,501,521 B2    12/2002 Matsushita et al.
2005/0264733 A1* 12/2005 Yang et al. .................. 349/117

FOREIGN PATENT DOCUMENTS

JP         2004-101950 A         4/2004

* cited by examiner

*Primary Examiner*—David Nelms
*Assistant Examiner*—David Y Chung
(74) *Attorney, Agent, or Firm*—Wei Te Chung

(57) ABSTRACT

An exemplary transmission liquid crystal display (200) includes a first substrate (215) and a second substrate (235); a liquid crystal layer (220) having liquid crystal molecules interposed between the first and second substrates; a front polarizer (211) disposed at an front surface of the first substrate, and a rear polarizer (231) disposed at a rear surface of the second substrate; a first quarter-wavelength compensation member (213) between the front polarizer and the first substrate; a second quarter-wavelength compensation member (234) between the rear polarizer and the second substrate; a first discotic molecular film (214) between the first quarter-wavelength compensation member and the first substrate; and a second discotic molecular film (234) between the second quarter-wavelength compensation member and the second substrate.

17 Claims, 3 Drawing Sheets

TRANSMISSION LIQUID CRYSTAL DISPLAY HAVING DISCOTIC MOLECULAR FILM

CROSS-REFERENCE TO RELATED APPLICATION

This application is related to, and claims the benefit of, a foreign priority application filed in Taiwan as Serial No. 094137840 on Oct. 28, 2005. The related application is incorporated herein by reference.

FIELD OF THE INVENTION

The present invention relates to transmission liquid crystal displays (LCDs), and more particularly to transmission LCDs having a discotic molecular film.

BACKGROUND

Recently, LCDs that are light and thin and have low power consumption characteristics have been widely used in office automation equipment, video units and the like. However, unlike the display images of CRTs (cathode ray tubes) and EL (electroluminescence) devices, the display images of LCDs do not emit light themselves. Accordingly, a transmissive LCD (also known as a transmission LCD) is equipped with a backlight at a rear of a display screen thereof.

As shown in FIG. 4, a conventional transmission liquid crystal display 100 includes a first glass substrate 115, a second glass substrate 135 opposite to the first substrate 115, and a liquid crystal layer 120 interposed between the first and second substrates 115, 135. A front polarizer 111 and a front retardation film 113 are disposed on an outer surface of the first substrate 115, in that order from top to bottom. A front alignment film 119 and a common electrode 117 are disposed on an inner surface of the first substrate 115, in that order from bottom to top. A pixel electrode 137 is laminated on an inner surface of the second substrate 135. A rear alignment film 139 is laminated on the pixel electrode 137. A rear retardation film 133 and a rear polarizer 131 are disposed on an outer surface of the second substrate 135, in that order from top to bottom. A backlight module 104 is provided under the rear polarizer 131.

The front retardation film 113 and the rear retardation film 133 are quarter-wavelength plates. Liquid crystal molecules (not labeled) of the liquid crystal layer 120 are homogeneously aligned. An absorption axis of the front polarizer 111 is orthogonal to that of the rear polarizer 131, and the front retardation film 113 has a slow axis perpendicular to a slow axis of the rear retardation film 133. The slow axis of the front retardation film 113 maintains an angle of 45 degrees relative to the absorption axis of the front polarizer 111.

The liquid crystal layer 120, the common electrode 117, and the pixel electrode 137 cooperatively define a pixel region. When a voltage is applied to the transmission LCD 100 (as shown in FIG. 5), an electric field is generated between the common electrode 117 and the pixel electrode 137. The electric field can control the orientation of the liquid crystal molecules in the liquid crystal layer 120 in order to display images. Anchoring energy exists between the alignment films 119, 139 and certain of the liquid crystal molecules adjacent to the alignment films 119, 139. Therefore when an electrical field is applied, these liquid crystal molecules need an unduly long amount of time to become oriented according to the applied electrical field. This typically results in residual images being produced. In addition, liquid crystal molecules adjacent to the alignment films 119, 139 cannot be aligned to perpendicular to the first and the second substrate 115, 135, respectively. Thus light beams that have different incident angles and that transmit through the liquid crystal layer 120 produce different phase delays. This lowers the contrast of images displayed by the LCD 100, and also narrows the viewing angle of the LCD 100.

What is needed, therefore, is a liquid crystal display device which has a fast response time.

SUMMARY

An exemplary transmission liquid crystal display includes a first substrate and a second substrate; a liquid crystal layer having liquid crystal molecules interposed between the first and second substrates; a front polarizer disposed at an front surface of the first substrate, and a rear polarizer disposed at a rear surface of the second substrate; a first quarter-wavelength compensation member between the front polarizer and the first substrate; a second quarter-wavelength compensation member between the rear polarizer and the second substrate; and a discotic molecular film between the first quarter-wavelength compensation member and the first substrate.

An alternative exemplary transmission liquid crystal display includes a first substrate and a second substrate; a liquid crystal layer having liquid crystal molecules interposed between the first and second substrates; a front polarizer disposed at an front surface of the first substrate, and a rear polarizer disposed at a rear surface of the second substrate; a first quarter-wavelength compensation member between the front polarizer and the first substrate; a second quarter-wavelength compensation member between the rear polarizer and the second substrate; and a discotic molecular film between the second quarter-wavelength compensation member and the second substrate.

Another alternative exemplary transmission liquid crystal display includes a first substrate and a second substrate; a liquid crystal layer having liquid crystal molecules interposed between the first and second substrates; a front polarizer disposed at an front surface of the first substrate, and a rear polarizer disposed at a rear surface of the second substrate; a first quarter-wavelength compensation member between the front polarizer and the first substrate; a second quarter-wavelength compensation member between the rear polarizer and the second substrate; a first discotic molecular film between the first quarter-wavelength compensation member and the first substrate; and a second discotic molecular film between the second quarter-wavelength compensation member and the second substrate.

Other advantages and novel features will become more apparent from the following detailed description when taken in conjunction with the accompanying drawings, in which:

DETAILED DESCRIPTION OF PREFERRED EMBODIMENTS

In this description, unless the context indicates otherwise, a reference to a compensation member is a reference to a kind of optical compensation member.

Figure 1:
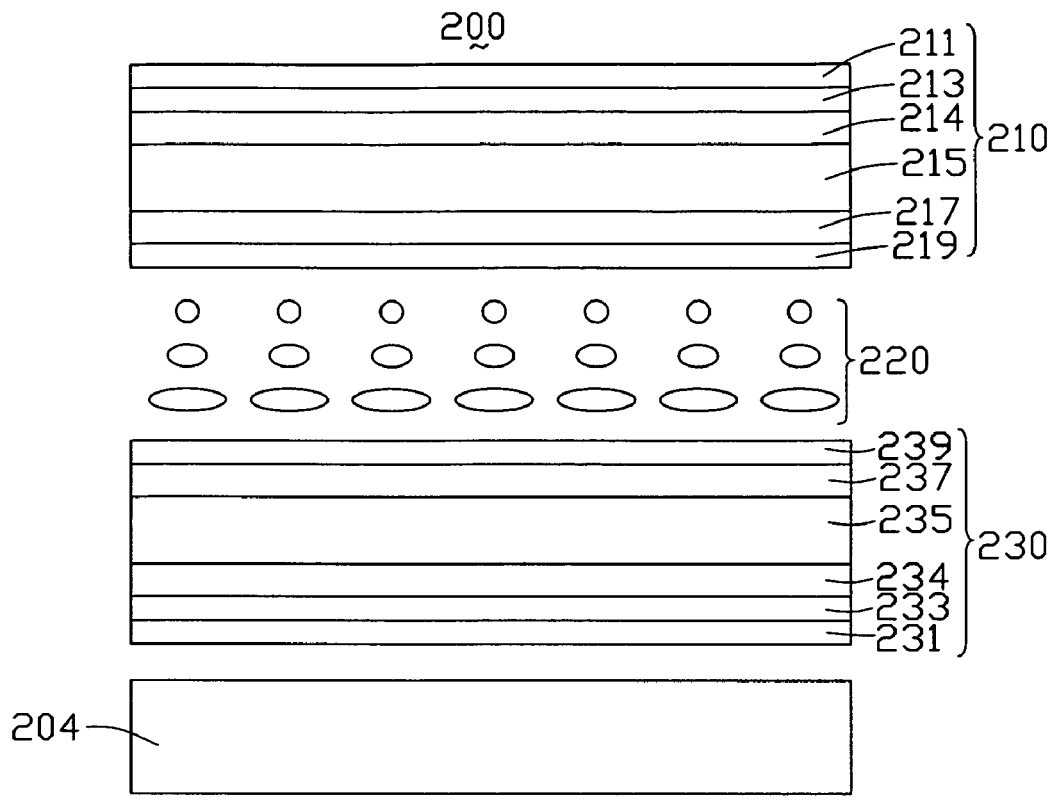
FIG. 1 is a schematic, side cross-sectional view of a transmission LCD according to a first preferred embodiment of the present invention.

FIG. 1 is a schematic, side cross-sectional view of a transmission LCD 200 according to a first preferred embodiment of the present invention. The transmission LCD 200 includes a first substrate assembly 210, a second substrate assembly 230 opposite to the first substrate assembly 210, and a liquid crystal layer 220 interposed between the first and second substrate assemblies 210, 230.

The first substrate assembly 210 includes a front polarizer 211, a first quarter-wavelength compensation member 213, a first discotic molecular film 214, a first glass substrate 215, a common electrode 217, and a front alignment film 219, which are laminated one on the other and disposed in that order from top to bottom. The front polarizer 211, the quarter-wavelength compensation member 213 and the discotic molecular film 214 are disposed on an outer surface of the first glass substrate 215, in that order from top to bottom. The front alignment film 219 and the common electrode 217 are disposed on an inner surface of the first glass substrate 215, in that order from bottom to top.

The second substrate assembly 230 includes a rear alignment film 239, a pixel electrode 237, a second glass substrate 235, a second discotic molecular film 234, a second quarter-wavelength compensation member 233, and a rear polarizer 231, which are laminated one on the other and disposed in that order from top to bottom. In addition, in a typical application, a backlight module 204 is provided under the rear polarizer 231.

The liquid crystal layer 220, the common electrode 217, and the pixel electrode 237 cooperatively define a pixel region. When a voltage is applied to the transmission LCD 200, an electric field is generated between the common electrode 217 and the pixel electrode 237. The electric field can control the orientation of liquid crystal molecules (not labeled) in the liquid crystal layer 220 in order to display images.

The liquid crystal molecules of the liquid crystal layer 220 are twisted nematic liquid crystal molecules, to enable the transmission LCD 200 to operate in a twisted nematic (TN) mode. A pretilt angle of the liquid crystal molecules adjacent to the substrate assemblies 210 and 230 is in a range of 0° to 15°. An alignment direction of the rear alignment film 239 maintains an angle in a range from 0 degrees to 90 degrees relative to that of the front alignment film 219. The common electrode 217 and the pixel electrode 237 are made from a transparent conductive material, such as Indium Tin Oxide (ITO) or Indium Zinc Oxide (IZO). The first and second substrates 215, 235 can instead be made from another kind of transparent material besides glass, such as silicon.

A slow axis of the first quarter-wavelength compensation member 213 is orthogonal to a slow axis of the second quarter-wavelength compensation member 233. An absorption axis of the front polarizer 211 is orthogonal to an absorption axis of the rear polarizer 231. An absorption axis of the first quarter-wavelength compensation member 213 maintains an angle of 45 degrees relative to the absorption axis of the front polarizer 211, and an absorption axis of the second quarter-wavelength compensation member 233 maintains an angle of 45 degrees relative to the absorption axis of the rear polarizer 231.

The first discotic molecular film 214 and the second discotic molecular film 234 are hybrid alignment molecular films. An alignment direction of discotic liquid crystal molecules of the first discotic molecular film 214 is parallel to the alignment direction of the front alignment film 219. A pretilt angle of discotic liquid crystal molecules of the first discotic molecular film 214 adjacent to the first quarter-wavelength compensation member 213 is in a range of 45° to 90°, and a pretilt angle of discotic liquid crystal molecules of the first discotic molecular film 214 adjacent to the first glass substrate 215 is in a range of 0° to 45°. An alignment direction of discotic liquid crystal molecules of the second discotic molecular film 234 is parallel to the alignment direction of the rear alignment film 239. A pretilt angle of discotic liquid crystal molecules of the second discotic molecular film 234 adjacent to the second quarter-wavelength compensation member 233 is in a range of 45° to 90°, and a pretilt angle of discotic liquid crystal molecules of the second discotic molecular film 234 adjacent to the second glass substrate 235 is in a range of 0° to 45°.

Unlike conventional technology, the transmission LCD 200 utilizes the first and second discotic molecular films 214, 234 to compensate for the different phase delays of light beams having different incident directions, which phase delays are produced by the liquid crystal molecules in the liquid crystal layer 220 adjacent to the first and second glass substrates 215, 235 having inclined alignments, not an orthogonal alignment. The first and second discotic molecular films 214, 234 can decrease the differences in the phase delays of the different light beams. This can improve the contrast of images displayed by the transmission LCD 200, and can widen the viewing angle of the transmission LCD 200.

Figure 2:
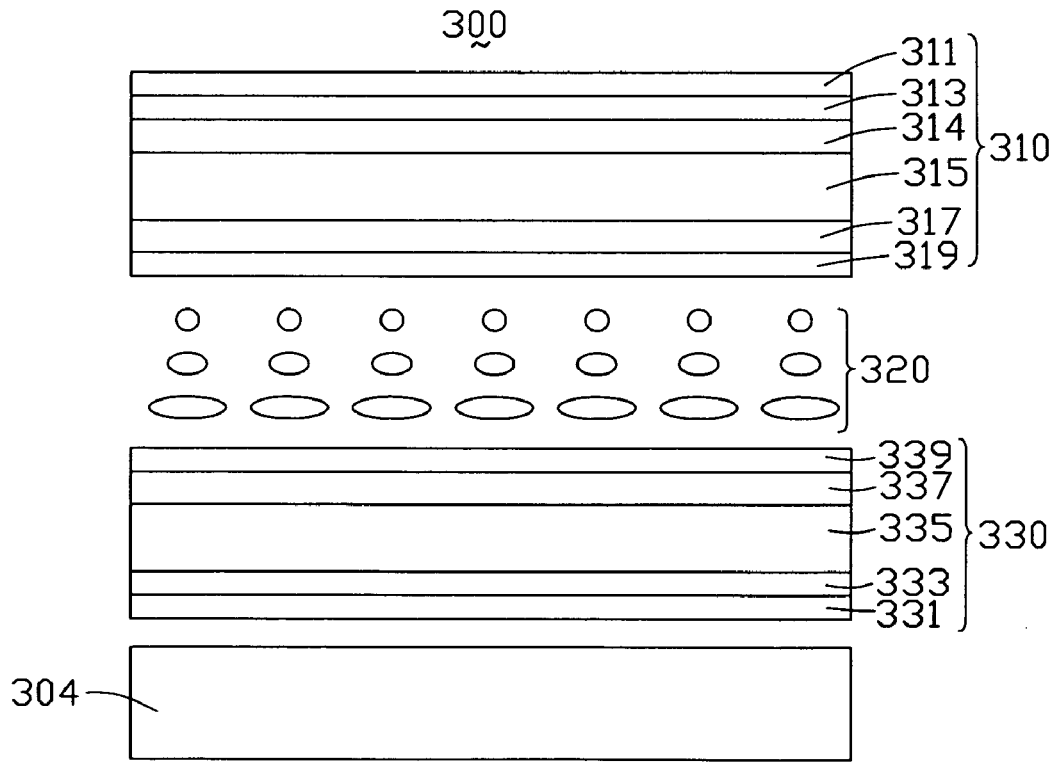
FIG. 2 is a schematic, side cross-sectional view of a transmission LCD according to a second preferred embodiment of the present invention.

FIG. 2 is a schematic, side cross-sectional view of a transmission LCD 300 according to a second preferred embodiment of the present invention. The transmission LCD 300 has a similar structure to that of the transmission LCD 200. However, the transmission LCD 300 includes a first substrate assembly 310, a second substrate assembly 330 opposite to the first substrate assembly 310, and a liquid crystal layer 320 interposed between the first and second substrate assemblies 310, 330.

The first substrate assembly 310 includes a front polarizer 311, a first quarter-wavelength compensation member 313, a discotic molecular film 314, a first glass substrate 315, a common electrode 317, and a front alignment film 319, which are laminated one on the other and disposed in that order from top to bottom. The front polarizer 311, the quarter-wavelength compensation member 313 and the discotic molecular film 314 are disposed on an outer surface of the first glass substrate 315, in that order from top to bottom. The front alignment film 319 and the common electrode 317 are disposed on an inner surface of the first glass substrate 315, in that order from bottom to top.

The second substrate assembly 330 includes a rear alignment film 339, a pixel electrode 337, a second glass substrate 335, a second quarter-wavelength compensation member 333, and a rear polarizer 331, which are laminated one on the other and disposed in that order from top to bottom. In addition, in a typical application, a backlight module 304 is provided under the rear polarizer 331.

The liquid crystal layer 320, the common electrode 317, and the pixel electrode 337 cooperatively define a pixel region. When a voltage is applied to the transmission LCD 300, an electric field is generated between the common electrode 317 and the pixel electrode 337. The electric field can control the orientation of liquid crystal molecules (not labeled) in the liquid crystal layer 320 in order to display images.

Liquid crystal molecules of the liquid crystal layer 320 are twisted nematic liquid crystal molecules, to enable the transmission LCD 300 to operate in a twisted nematic (TN) mode. A pretilt angle of the liquid crystal molecules adjacent to the substrate assemblies 310 and 330 is in a range of 0° to 15°. An alignment direction of the rear alignment film 339 maintains an angle in a range from 0 degrees to 90 degrees relative to that of the front alignment film 319. The common electrode 317 and the pixel electrode 337 are made from a transparent conductive material, such as Indium Tin Oxide (ITO) or Indium Zinc Oxide (IZO). The first and second substrates 315, 335 can instead be made from another kind of transparent material besides glass, such as silicon.

A slow axis of the first quarter-wavelength compensation member 313 is orthogonal to a slow axis of the second quarter-wavelength compensation member 333. An absorption axis of the front polarizer 311 is orthogonal to an absorption axis of the rear polarizer 331. An absorption axis of the first quarter-wavelength compensation member 313 maintains an angle of 45 degrees relative to the absorption axis of the front polarizer 311, and an absorption axis of the second quarter-wavelength compensation member 333 maintains an angle of 45 degrees relative to the absorption axis of the rear polarizer 331.

The discotic molecular film 314 is a hybrid alignment molecular film. An alignment direction of discotic liquid crystal molecules of the discotic molecular film 314 is parallel to a bisector of an angle defined by the alignment directions of the front and rear alignment films 319, 339. A pretilt angle of discotic liquid crystal molecules of the discotic molecular film 314 adjacent to the first quarter-wavelength compensation member 313 is in a range of 45° to 90°, and a pretilt angle of discotic liquid crystal molecules of the discotic molecular film 314 adjacent to the first glass substrate 315 is in a range of 0° to 45°.

Unlike conventional technology, the transmission LCD 300 utilizes the discotic molecular film 314 to compensate for the different phase delays of light beams having different incident directions, which phase delays are produced by the liquid crystal molecules in the liquid crystal layer 320 adjacent to the first and second glass substrates 315, 335 having inclined alignments, not an orthogonal alignment. The discotic molecular film 314 can decrease the differences in the phase delays of the different light beams. This can improve the contrast of images displayed by the transmission LCD 300, and can widen the viewing angle of the transmission LCD 300.

Figure 3:
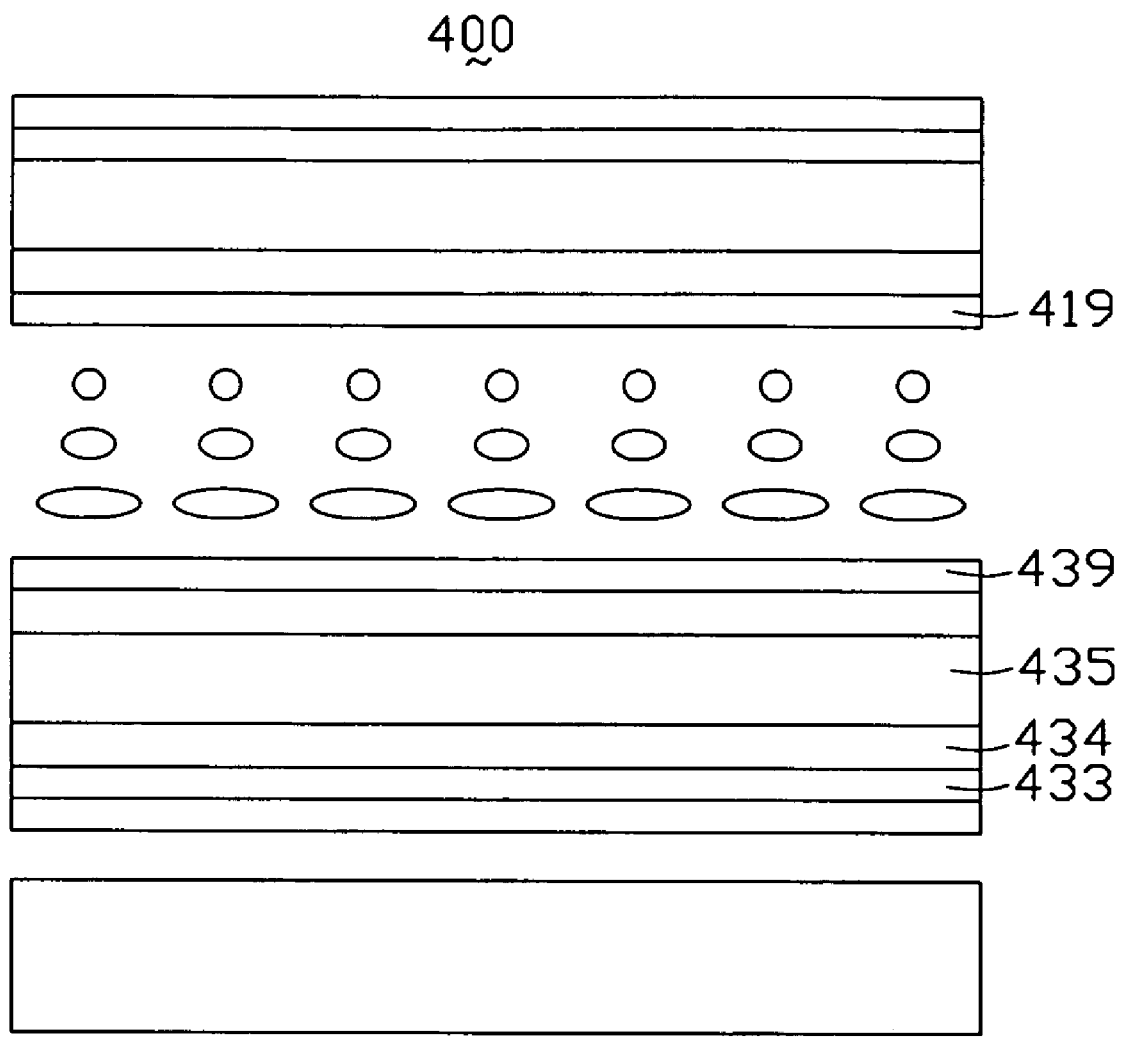
FIG. 3 is a schematic, side cross-sectional view of a transmission LCD according to a third preferred embodiment of the present invention.
Figure 4:
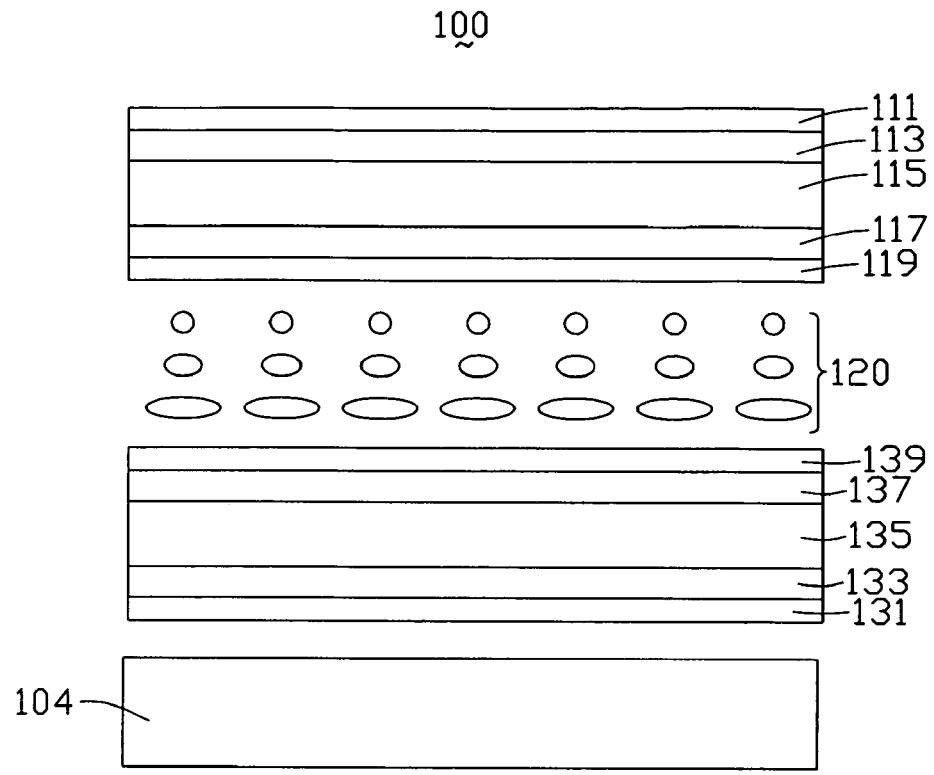
FIG. 4 is a schematic, side cross-sectional view of a conventional transmission LCD.
Figure 5:
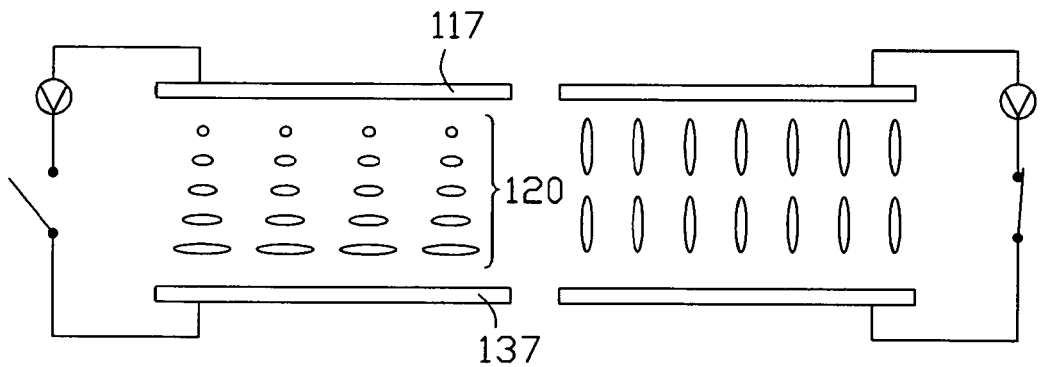
FIG. 5 is a view showing certain parts of the transmission LCD of FIG. 4, and illustrating an operational theory of the transmission LCD.

FIG. 3 is a schematic, side cross-sectional view of a transmission LCD 400 according to a third preferred embodiment of the present invention. The transmission LCD 400 has a similar structure to that of the transmission LCD 300. However, the transmission LCD 400 includes a discotic molecular film 434 disposed between a second quarter-wavelength compensation member 433 and a second glass substrate 435. The discotic molecular film 434 is a hybrid alignment molecular film. An alignment direction of discotic liquid crystal molecules of the discotic molecular film 434 is parallel to a bisector of an angle defined by alignment directions of a front alignment film 419 and a rear alignment film 439. A pretilt angle of discotic liquid crystal molecules of the discotic molecular film 434 adjacent to the first quarter-wavelength compensation member 433 is in a range of 45° to 90°, and a pretilt angle of discotic liquid crystal molecules of the discotic molecular film 434 adjacent to the second glass substrate 435 is in a range of 0° to 45°.

The transmission LCD 400 has advantages similar to those of the transmission LCD 300. The discotic molecular film 434 can decrease the differences in the phase delays of the different light beams. This can improve the contrast of images displayed by the transmission LCD 400, and can widen the viewing angle of the transmission LCD 400.

It is to be understood, however, that even though numerous characteristics and advantages of various embodiments have been set forth in the foregoing description, together with details of the structures and functions of the embodiments, the disclosure is illustrative only, and changes may be made in detail to the full extent indicated by the broad general meaning of the terms in which the appended claims are expressed.

What is claimed is:

1. A transmission liquid crystal display, comprising:
a first substrate and a second substrate;
a liquid crystal layer having liquid crystal molecules between the first and second substrates;
a front polarizer disposed at a front surface of the first substrate, and a rear polarizer disposed at a rear surface of the second substrate;
a first quarter-wavelength compensation member between the front polarizer and the first substrate;
a second quarter-wavelength compensation member between the rear polarizer and the second substrate;
a first discotic molecular film between the first quarter-wavelength compensation member and the first substrate;
a front alignment film between the first substrate and the liquid crystal layer; and
a rear alignment film between the second substrate and the liquid crystal layer;
wherein a pretilt angle of liquid crystal molecules adjacent to the first and second substrates is in a range of 0 degrees to 15 degrees, and an alignment direction of the rear alignment film maintains an angle in a range from 0 degrees to 90 degrees relative to that of the front alignment film.

2. The transmission liquid crystal display as claimed in claim 1, wherein an alignment direction of discotic liquid crystal molecules of the first discotic molecular film is parallel to a bisector of an angle defined by the alignment directions of the front and rear alignment films.

3. The transmission liquid crystal display as claimed in claim 1, wherein a pretilt angle of discotic liquid crystal molecules of the first discotic molecular film adjacent to the first quarter-wavelength compensation member is in a range of 45 degrees to 90 degrees, and a pretilt angle of discotic liquid crystal molecules of the first discotic molecular film adjacent to the first substrate is in a range of 0 degrees to 45 degrees.

4. A transmission liquid crystal display, comprising:
a first substrate and a second substrate;
a liquid crystal layer having liquid crystal molecules between the first and second substrates;
a front polarizer disposed at a front surface of the first substrate, and a rear polarizer disposed at a rear surface of the second substrate;
a first quarter-wavelength compensation member between the front polarizer and the first substrate;
a second quarter-wavelength compensation member between the rear polarizer and the second substrate;

a first discotic molecular film between the second quarter-wavelength compensation member and the second substrate;

a front alignment film between the first substrate and the liquid crystal layer; and a rear alignment film between the second substrate and the liquid crystal layer;

wherein a pretilt angle of liquid crystal molecules adjacent to the first and second substrates is in a range of 0 degrees to 15 degrees, and an alignment direction of the rear alignment film maintains an angle in a range from 0 degrees to 90 degrees relative to that of the front alignment film.

5. The transmission liquid crystal display as claimed in claim 4, wherein an alignment direction of discotic liquid crystal molecules of the first discotic molecular film is parallel to a bisector of an angle defined by the alignment directions of the front and rear alignment films.

6. The transmission liquid crystal display as claimed in claim 4, wherein a pretilt angle of discotic liquid crystal molecules of the first discotic molecular film adjacent to the first quarter-wavelength compensation member is in a range of 45 degrees to 90 degrees, and a pretilt angle of discotic liquid crystal molecules of the first discotic molecular film adjacent to the second substrate is in a range of 0 degrees to 45 degrees.

7. The transmission liquid crystal display as claimed in claim 1, wherein an alignment direction of discotic liquid crystal molecules of the first discotic molecular film is parallel to the alignment direction of the front alignment film, a pretilt angle of discotic liquid crystal molecules of the first discotic molecular film adjacent to the first quarter-wavelength compensation member is in a range of 45 degrees to 90 degrees, and a pretilt angle of discotic liquid crystal molecules of the first discotic molecular film adjacent to the first substrate is in a range of 0 degrees to 45 degrees.

8. The transmission liquid crystal display as claimed in claim 1, further comprising a second discotic molecular film between the second quarter-wavelength compensation member and the second substrate.

9. The transmission liquid crystal display as claimed in claim 8, wherein an alignment direction of discotic liquid crystal molecules of the second discotic molecular film is parallel to the alignment direction of the rear alignment film, a pretilt angle of discotic liquid crystal molecules of the second discotic molecular film adjacent to the second quarter-wavelength compensation member is in a range of 45 degrees to 90 degrees, and a pretilt angle of discotic liquid crystal molecules of the second discotic molecular film adjacent to the second substrate is in a range of 0 degrees to 45 degrees.

10. The transmission liquid crystal display as claimed in claim 4, wherein an alignment direction of discotic liquid crystal molecules of the first discotic molecular film is parallel to the alignment direction of the front alignment film, a pretilt angle of discotic liquid crystal molecules of the first discotic molecular film adjacent to the first quarter-wavelength compensation member is in a range of 45 degrees to 90 degrees, and a pretilt angle of discotic liquid crystal molecules of the first discotic molecular film adjacent to the first substrate is in a range of 0 degrees to 45 degrees.

11. The transmission liquid crystal display as claimed in claim 4, further comprising a second discotic molecular film between the second quarter-wavelength compensation member and the second substrate.

12. The transmission liquid crystal display as claimed in claim 11, wherein an alignment direction of discotic liquid crystal molecules of the second discotic molecular film is parallel to the alignment direction of the rear alignment film, a pretilt angle of discotic liquid crystal molecules of the second discotic molecular film adjacent to the second quarter-wavelength compensation member is in a range of 45 degrees to 90 degrees, and a pretilt angle of discotic liquid crystal molecules of the second discotic molecular film adjacent to the second substrate is in a range of 0 degrees to 45 degrees.

13. A transmission liquid crystal display, comprising:
a first substrate and a second substrate;
a liquid crystal layer having liquid crystal molecules interposed between the first and second substrates;
a front polarizer disposed at a front surface of the first substrate, and a rear polarizer disposed at a rear surface of the second substrate;
a first quarter-wavelength compensation member between the front polarizer and the first substrate;
a second quarter-wavelength compensation member between the rear polarizer and the second substrate;
a first discotic molecular film between the first quarter-wavelength compensation member and the first substrate;
a front alignment film between the first substrate and the liquid crystal layer; and
a rear alignment film between the second substrate and the liquid crystal layer;
wherein an alignment direction of discotic liquid crystal molecules of the first discotic molecular film is parallel to a bisector of an angle defined by the alignment directions of the front and rear alignment films.

14. The transmission liquid crystal display as claimed in claim 13, wherein a pretilt angle of liquid crystal molecules adjacent to the first and second substrates is in a range of 0 degrees to 15 degrees, and an alignment direction of the rear alignment film maintains an angle in a range from 0 degrees to 90 degrees relative to that of the front alignment film.

15. The transmission liquid crystal display as claimed in claim 13, wherein a pretilt angle of discotic liquid crystal molecules of the first discotic molecular film adjacent to the first quarter-wavelength compensation member is in a range of 45 degrees to 90 degrees, and a pretilt angle of discotic liquid crystal molecules of the first discotic molecular film adjacent to the first substrate is in a range of 0 degrees to 45 degrees.

16. The transmission liquid crystal display as claimed in claim 15, further comprising a second discotic molecular film between the second quarter-wavelength compensation member and the second substrate.

17. The transmission liquid crystal display as claimed in claim 16, wherein a pretilt angle of discotic liquid crystal molecules of the second discotic molecular film adjacent to the second quarter-wavelength compensation member is in a range of 45 degrees to 90 degrees, and a pretilt angle of discotic liquid crystal molecules of the second discotic molecular film adjacent to the second substrate is in a range of 0 degrees to 45 degrees.

* * * * *